(No Model.)
W. HEISER.
ELASTIC WASHER.
No. 524,851.  Patented Aug. 21, 1894.
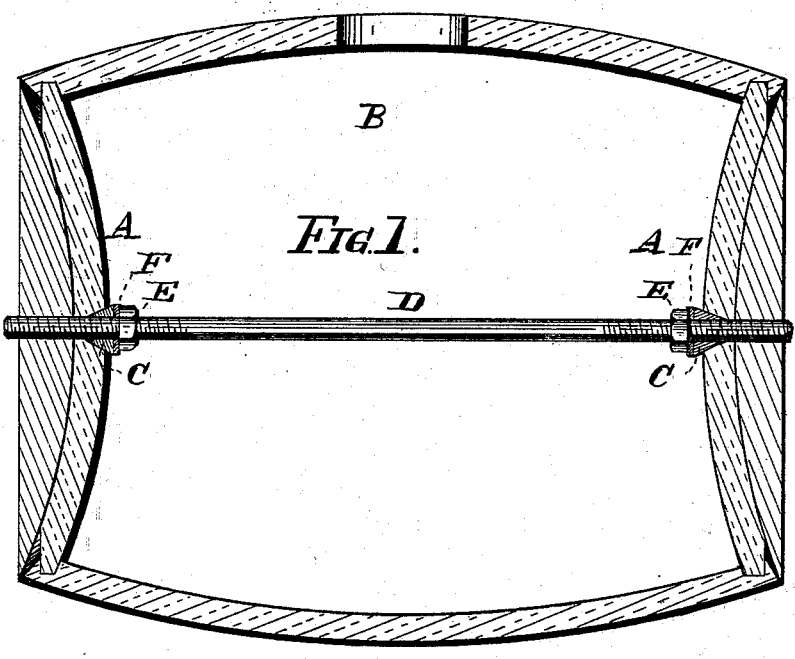
Fig. 1.
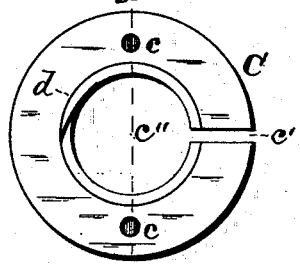
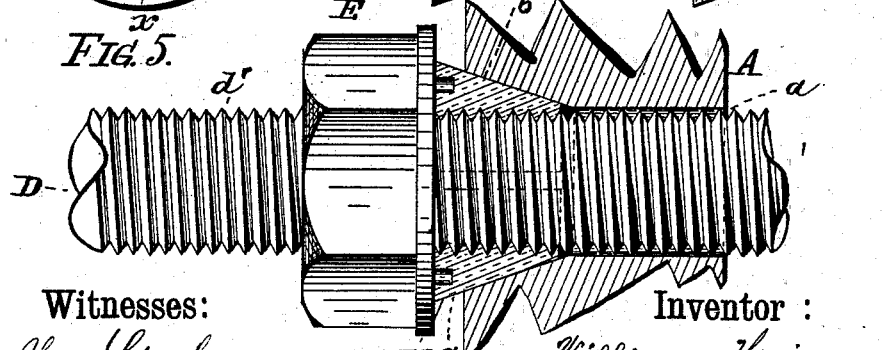
Witnesses:
A. Stark
Centie S. Stark
Inventor:
William Heiser,
by Michael J. Stark
Attorney ns in the drawings already mentioned, which

UNITED STATES PATENT OFFICE.

WILLIAM HEISER, OF BUFFALO, NEW YORK.

ELASTIC WASHER.

SPECIFICATION forming part of Letters Patent No. 524,851, dated August 21, 1894.

Application filed February 26, 1894. Serial No. 501,587. (No model.)

*To all whom it may concern:*

Be it known that I, WILLIAM HEISER, a citizen of the United States, residing at Buffalo, in the county of Erie and State of New York, have invented certain new and useful Improvements in Elastic Washers; and I do hereby declare that the following description of my said invention, taken in connection with the accompanying sheet of drawings, forms a full, clear, and exact specification, which will enable others skilled in the art to which it appertains to make and use the same.

This invention has general reference to improvements in elastic washers; and it consists, essentially, in the novel and peculiar combination of parts and details of construction as hereinafter first fully set forth and described and then pointed out in the claims.

In the drawings already mentioned, which serve to illustrate my said invention more fully, Figure 1 is a longitudinal sectional elevation of a barrel or cask showing my improved washers in connection with a brace-rod employed in the same for tensioning its heads. Fig. 2 is an end view of the washer detached. Fig. 3 is a side, and Fig. 4 a sectional elevation in line $x\,x$ of Fig. 2. Fig. 5 is a plan of a screw, stud or bolt provided with my improved washer.

Like parts are designated by corresponding letters of reference in all the figures.

The object of my present invention is the production of an elastic washer or packing ring capable of being applied to a screw-rod, bolt, stud or similar article without entirely removing a nut upon said bolt, &c.

This washer or packing ring is especially designed for use in connection with the brace-rods of a large barrel, cask or other similar wooden vessel having brace-rods for tensioning and stiffening the heads of these vessels; but it is capable of being employed in many other cases where a screw-threaded rod, bolt, stud or tie-rod is passed through an object, and where a tight joint is desired to be effected and where the said rod, bolt, stud or similar article cannot be readily removed after it has once been put into its predesigned position. To attain this result I provide in the head A of a barrel or other object B a cylindrical hole or passage $a$, and a conical or tapering enlargement $b$, of a sufficiently large size to receive an elastic washer C, of the shape of a truncated cone, in the base of which I provide recesses $c$, for the application of a wrench or similar implement for turning or revolving the said washer. This washer I slit longitudinally at $c'$, and provide its bore $c''$ with an internal screw-thread $d$, fitting the external screw-thread $d'$ of a rod, bolt or stud D, with a reasonable fit. Upon this rod D is placed a nut E, and also, when desired—though not always required—a metallic washer F, bearing upon the base of the elastic washer C.

In practice, the nut E is unscrewed sufficiently far from the object A so that I can apply the elastic washer C to the rod, stud or bolt D, said washer being, by preference, made of a good quality of rubber, and on account of its being longitudinally slitted, may be opened up and passed over the rod D, after which it will again close sufficiently to enable its being screwed into position in the conical enlargement $b$ of the bore $a$ and thereby to close the longitudinal slit $c'$. Now the nut E is applied, which will compress the rubber washer C so as to tightly embrace the screw D and thereby make a tight joint around the said rod.

I produce these washers in suitable molds and of as many sizes as are required to meet the contingencies of the market.

It will be observed that in cases like the one illustrated in Fig. 1, *i. e.*, in barrels having brace-rods D as shown, this elastic washer is readily and quickly applied and thereby saves considerable time in making a tight joint between said rod and the heads A.

Having thus fully described my invention, I claim as new and desire to secure by Letters Patent of the United States—

1. As an improved article of manufacture, an elastic, compressible washer of the contour of a truncated cone having its bore provided with a screw-thread and its body longitudinally slitted and its base provided with oppositely-located recesses, as and for the object set forth.

2. In combination, with the object A having a cylindrical aperture $a$, and conical enlargement $b$, of an elastic washer of the contour of a truncated cone having centrally a screw-threaded aperture and its body longitudinally slitted and its base provided with means substantially as described for screwing it upon a rod, the screw-threaded rod D and nut E, as and for the object set forth.

In testimony that I claim the foregoing as my invention I have hereunto set my hand in the presence of two subscribing witnesses.

WM. HEISER.

Witnesses:
 ALBERT G. HEISER,
 MICHAEL J. STARK.